United States Patent [19]
Luecke et al.

[11] Patent Number: 5,216,562
[45] Date of Patent: Jun. 1, 1993

[54] MULTI-BEAM OPTICAL RECORDING SYSTEM AND METHOD

[75] Inventors: Francis S. Luecke, San Jose; Leroy D. Dickson, Morgan Hill, both of Calif.

[73] Assignee: International Business Machines Corporation, Armonk, N.Y.

[21] Appl. No.: 844,961

[22] Filed: Feb. 28, 1992

Related U.S. Application Data

[63] Continuation of Ser. No. 587,706, Sep. 25, 1990, abandoned.

[51] Int. Cl.$^5$ .............................................. G11B 5/127
[52] U.S. Cl. .................................. 360/114; 369/44.37; 369/44.38; 369/44.12; 359/280; 359/290
[58] Field of Search ................... 360/114, 59; 369/13, 369/44.12, 44.37, 44.38, 110, 112, 116; 359/246, 247, 280, 290, 292, 726, 727, 834

[56] References Cited

U.S. PATENT DOCUMENTS

| | | | |
|---|---|---|---|
| 3,367,733 | 2/1968 | Grau | 350/383 |
| 3,715,740 | 2/1973 | Schmit | 360/59 |
| 3,731,290 | 5/1973 | Aagard | 360/59 |
| 4,071,297 | 1/1978 | Leitz | 356/375 |
| 4,458,144 | 7/1984 | Reilly et al. | 250/204 |
| 4,458,980 | 7/1984 | Oki et al. | 350/3.73 |
| 4,464,741 | 8/1984 | Compaan | 369/45 |
| 4,489,408 | 12/1984 | Verhoeven et al. | 369/112 |
| 4,497,047 | 1/1985 | Fujiie et al. | 369/45 |
| 4,513,408 | 4/1985 | Nomura et al. | 369/45 |
| 4,525,825 | 6/1985 | Ito et al. | 369/45 |
| 4,561,081 | 12/1985 | Janssen et al. | 369/45 |
| 4,694,447 | 9/1987 | Cohen | 350/286 |
| 4,716,283 | 12/1987 | Ando | 250/201 |
| 4,742,219 | 5/1988 | Ando | 250/201 |
| 4,778,984 | 10/1988 | Nakamura | 250/201 |
| 4,779,250 | 10/1988 | Kogure | 365/122 |
| 4,797,868 | 1/1989 | Ando | 365/122 |
| 4,816,665 | 3/1989 | Hsu | 369/46 |
| 4,819,220 | 4/1989 | Miyazaki et al. | 369/45 |
| 4,823,331 | 4/1989 | Yoshitoshi et al. | 369/45 |
| 4,826,292 | 5/1989 | Spohr | 350/286 |
| 4,853,923 | 8/1989 | Yamada | 369/13 |
| 4,855,987 | 8/1989 | Versluis | 369/44.37 |
| 4,888,755 | 12/1989 | Itoh | 369/44.37 |
| 4,907,858 | 3/1990 | Hara | 350/286 |
| 4,935,911 | 6/1990 | Ohuchida | 369/13 |
| 4,945,529 | 7/1990 | Ono | 369/110 |
| 4,965,780 | 10/1990 | Lee et al. | 369/110 |
| 4,989,189 | 1/1991 | Sander | 369/13 |
| 4,993,011 | 2/1991 | Torazawa | 369/13 |
| 5,023,860 | 6/1991 | Ueda | 369/44.37 |

FOREIGN PATENT DOCUMENTS

| | | | |
|---|---|---|---|
| 0184750 | 6/1986 | European Pat. Off. | |
| 0228620 | 7/1987 | European Pat. Off. | |
| 4003962 | 7/1987 | Fed. Rep. of Germany | |
| 0077046 | 5/1983 | Japan | 369/13 |
| 59-14652 | 8/1984 | Japan | |
| 59-146449 | 8/1984 | Japan | |
| 0319148 | 12/1989 | Japan | 350/383 |

OTHER PUBLICATIONS

S. Nakamura, et al., "Compact Two-Beam Head with a Hybrid Two-Wavelength Laser Array for Magneto-Optic Recording," Japanese Journal of Applied Physics, vol. 26, pp. 117-120, (1987).

R. Katayama, et al., "Multi-Beam Magneto-Optical Disk Drive for Parallel Read/Write Operation," SPIE, vol. 1078, pp. 98-104, Optical Data Storage Meeting (1989).

*Primary Examiner*—Eugene R. LaRoche
*Assistant Examiner*—Tan Nguyen
*Attorney, Agent, or Firm*—Douglas R. Millett

[57] ABSTRACT

A laser array provides multiple closely spaced light beams. These light beams are reflected off of an optical recording medium. A faceted prism is used to separate the closely spaced beams sets for detection by an optical detector array and detector circuit. The detector circuit provides data, power, tracking and focus signals.

18 Claims, 3 Drawing Sheets

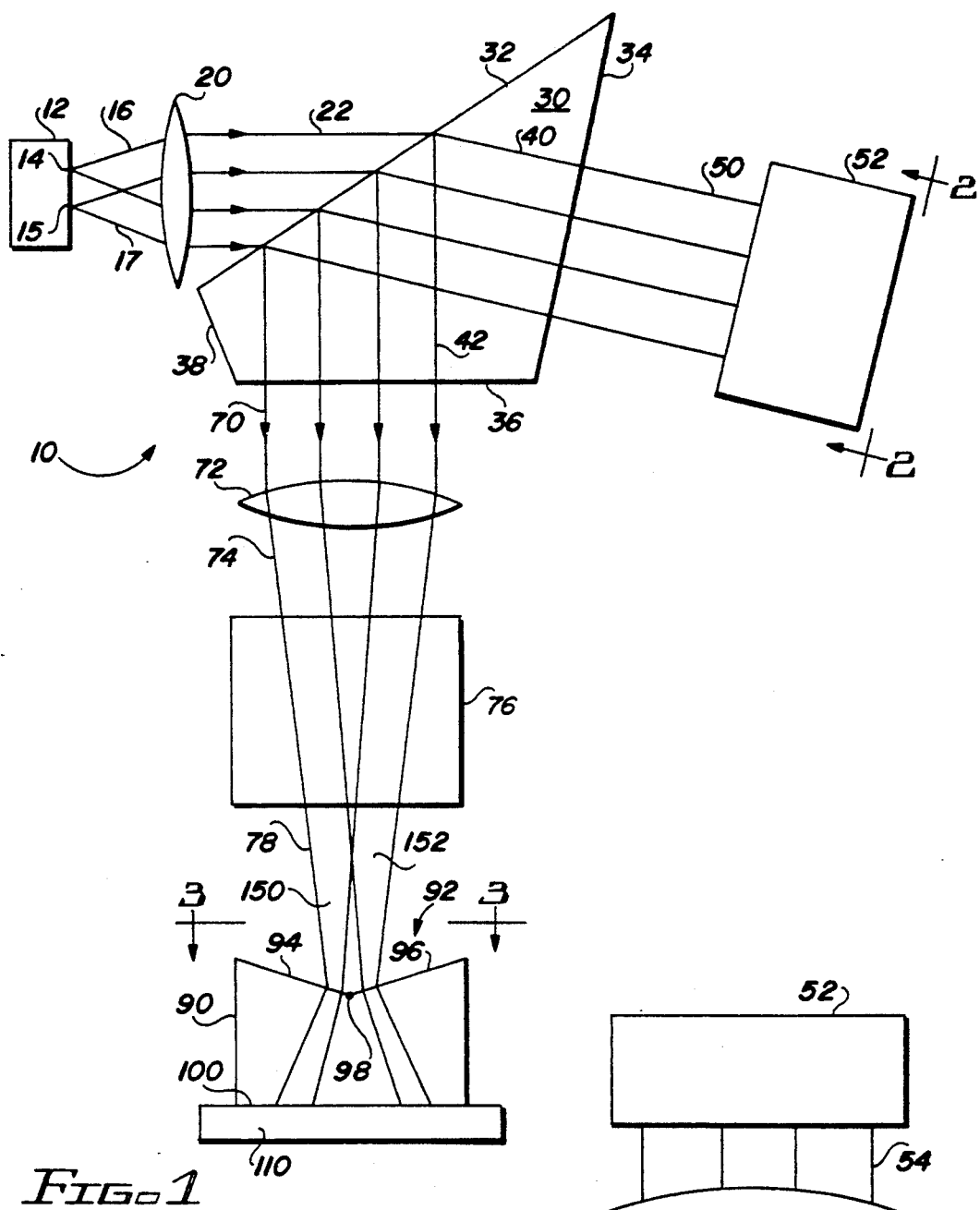
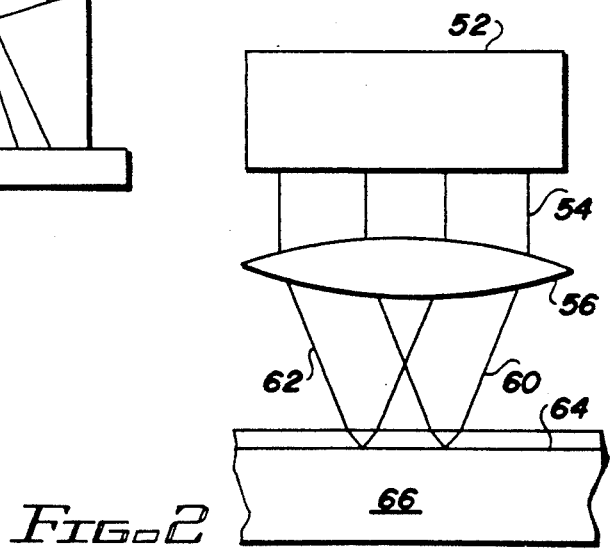
FIG. 1
FIG. 2

MULTI-BEAM OPTICAL RECORDING SYSTEM AND METHOD

This is a continuation of copending application Ser. No. 07/587,706 filed on Sep. 25, 1990, abandoned.

BACKGROUND OF THE INVENTION

1. Field of the Invention

This invention relates to optical recording systems and more particularly to optical recording systems employing more than one light beam.

2. Description of the Prior Art

Magneto-optic recording provides for erasable storage of data. A laser beam is focused onto a spot on the medium and heats the magneto-optic material to a temperature at which the magnetic domain of the medium may be changed. A magnetic field is applied in one of two directions to orient the magnetic domain of the spot in either an upward or downward direction.

The disk is read by focusing a low power polarized laser beam onto the magneto-optic material. The Kerr effect causes the reflected beam's plane of polarization to be rotated either clockwise or counter-clockwise depending on whether the spot has an upward or downward magnetic orientation. The difference in the rotation is detected and represents data ones and zeros.

The typical system today uses one laser with variable power to do both writing and reading. In order to verify the data recorded, the disk must be rotated twice for each track recorded. One revolution is required to write the track and a second revolution is required to read and verify the track just written.

In order to speed up the recording process, direct read after write (DRAW) systems have been proposed. These systems comprise two lasers; one laser to write a track and a second laser to read the track directly after it has been written. Thus, a DRAW system requires only one revolution of the disk to write and verify a track.

A problem with DRAW systems has been that the addition of the second laser greatly complicates the construction of the optical channel. The beams must be spaced close together in order to focus on the same track at the same time and to prevent aberration and truncation (beam obstruction) effects. However, this close spacing makes separation and detection of the beams difficult. Additional optical components and space are often required to achieve the necessary beam separation. What is needed is a DRAW system with a minimum number of components.

SUMMARY OF THE INVENTION

In accordance with the invention, a laser array provides a first and a second beam of polarized light. A circularizing prism circularizes the first and second beams of light. The beams are directed to a disk medium and a first and a second reflected beam are returned from the medium. The reflected beams are each separated into two linearly polarized components by a Wollaston prism. The beams are then separated by a faceted prism and directed to a single optical detector array. The detector array provides data, power, focus and tracking information.

For a fuller understanding of the nature and advantages of the present invention, reference should be made to the following detailed description taken in conjunction with the accompanying drawings.

BRIEF DESCRIPTION OF THE DRAWINGS

FIG. 1 is a schematic diagram of the DRAW system of the present invention;

FIG. 2 is a schematic diagram of a portion of the DRAW system of FIG. 1;

DESCRIPTION OF THE PREFERRED EMBODIMENTS

Figure 3:
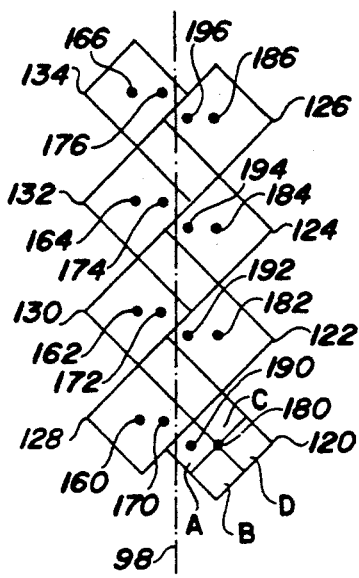
FIG. 3 is a schematic diagram of the detector of the DRAW system of FIG. 1.

FIG. 1 shows a direct read after write (DRAW) system of the present invention and is designated by the general reference number 10. A diode laser array 12 has a pair of diode lasers 14 and 15, and produces a pair of polarized light beams 16 and 17. A collimating lens 20 collimates the beams 16 and 17 into an optical path 22. Due to their separate points of origin, the beams 16 and 17 are not perfectly parallel after they pass through lens 20 but have a very small angle of divergence with respect to one another.

A circularizing prism 30 has a plurality of surfaces 32, 34, 36 and 38. Surface 32 is coated with a multilayer dielectric coating which provides high internal light reflectance. Prism 30 has two internal beam paths 40 and 42. The light beams from diode lasers 14 and 15 have an oblong cross-sectional beam pattern. Surface 32 is offset at an angle relative to beam path 22 such that the light beams in beam path 40 have a circular cross-sectional beam pattern. A beam path 50 connects prism 30 to a mirror 52.

FIG. 2 shows a view of system 10 taken along line 2—2 of FIG. 1. An optical path 54 connects mirror 50 to a focusing lens 56. Lens 56 focuses a pair of light beams 60 and 62 onto a recording surface 64 of a magneto-to-optic (MO) recording disk 66.

Returning to FIG. 1, a beam path 70 connects prism 30 to an anamorphic lens 72. A beam path 74 connects lens 72 to a Wollaston prism 76. A beam path 78 connects prism 76 to a faceted prism 90. Prism 90 is preferably made of glass or a transparent plastic. Prism 90 has a faceted side 92 having a face 94 and a face 96 such that side 92 is concave. An axis or vertex 98 is the line of intersection of faces 94 and 96. Vertex 98 is oriented perpendicular to the surface of the drawing of FIG. 1. Prism 90 has a bottom surface 100 which is positioned over an optical detector 110.

Figure 4:
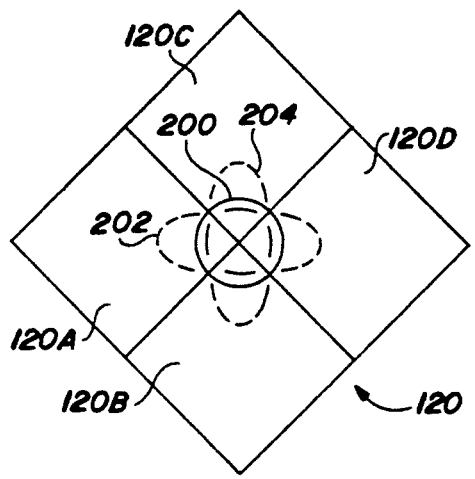
FIG. 4 is a schematic diagram of a portion of the optical detector of FIG. 3.

FIG. 3 shows a top view of detector 110 taken along line 3—3 of FIG. 1. Optical detector 110 comprises a plurality of sections 120, 122, 124, 126, 128, 130, 132 and 134. Section 120 is further divided into a plurality of subsections 120A, 120B, 120C and 120D. FIG. 4 shows a more detailed view of detector section 120.

The operation of system 10 may now be understood. Laser array 12 produces light beams 16 and 17. Beam 16 is used for reading and writing (R/W) and beam 17 is used for the direct read after write (DRAW) function.

The laser diodes 14 and 15 may preferably be spaced 25 to 200 microns apart. If the lasers 14 and 15 are spaced too far apart, then beams 16 and 17 will have aberration and truncation problems. Both of these problems occur when one of the beams is too far away from the center axis of lens 20 and lens 56.

Lens 20 approximately collimates the beams 16 and 17 and directs them along path 22 to circularizing prism 30. Surface 32 circularizes light which travels along path 40 to surface 34. The light emitted from diode lasers typically has an oblong cross-sectional beam pattern and prism 30 refracts the beam so that the resulting beam has a circular cross-section. A small portion of the light is reflected at surface 34 back along path 40. These two reflected beams are known as ghost beams and are offset slightly from the original beams. The offset is caused by positioning surface 34 at an angle of 0.5 to 2 degrees from the perpendicular to beam path 40. The original beams pass through surface 34 and continue along path 50.

Mirror 52 directs the polarized light beams along path 54 to lens 56. The two beams 60 and 62 are focused on a single track of disk 66. Beam 60 is the R/W beam which precedes the DRAW beam 62 as the track moves to the left. The light beams are then reflected from disk 66 back to lens 56, along path 54, reflected off of mirror 52 and along path 50 to prism 30. The two beams enter through surface 34 to optical path 40. Optical path 40 now contains six beams. One pair of original beams going toward surface 34 and disk 66, one pair of reflected beams returning from disk 66 through surface 34, and one pair of ghost beams reflected directly from surface 34.

The reflected beam pair and the ghost beam pair are reflected off of surface 32 along optical path 42. The beams exit through surface 36 along beam path 70 to anamorphic lens 72. The light is focused at lens 72 along path 74 to Wollaston prism 76. There are now four different beams in path 74: the two reflected beams and the two ghost beams.

The Wollaston prism 76 divides each polarized light beam into a pair of linearly orthogonal polarized light beams. The four beams along path 74 are all polarized and so the result is that eight linearly polarized light beams exit along beam path 78. Beam path 78 thus contains a set of light beams 150 comprising four beams associated with the read/write laser 14 and a set of four light beams 152 comprising four light beams associated with the DRAW laser 15.

The vertex 98 of prism 90 is located at the first (near) focal point of lens 72. When beams 60 and 62 are in focus and on track, then the beam sets 150 and 152 are each comprised of beams having oblong cross-sectional beam shapes at the first (near) focal point of lens 72. The beams of sets 150 and 152 have the long axis of their oblong beam pattern oriented parallel to vertex 98. It should be noted that at the focus point of lens 72, the beam sets 150 and 152 are too close together (approximately 20-30 microns) for detection with optical detectors. The prism 90 solves this problem. Beam set 150 hits face 94 and beam set 152 hits face 96 such that the two sets of light beams are directed away from each other.

The angle of faces 94 and 96 relative to the center line of beam set 150 and 152 and the height of prism 90 between vertex 98 and surface 100 is determined by the amount of separation necessary at photodetector 110 and by the distance between the two focal planes of lens 72. The center lines of beam sets 150 and 152 preferably have a separation of 50-100 microns at photodetector 110. In a preferred embodiment, the distance between vertex 98 and surface 100 is 0.8 mm and the angle between face 94 and the centerline of beam set 150 and the angle between face 96 and the centerline of beam set 152 are both forty degrees.

FIG. 3 shows a top view of detector 110 through prism 90. Beam set 150 comprises four beams 160, 162, 164 and 166 which have beam center points of 170, 172, 174 and 176, respectively, at face 94. The beams are deflected to the left such that the center of each beam 160, 162, 164 and 166 falls on the center of detectors 128, 130, 132 and 134, respectively. Beam set 152 comprises four beams 180, 182, 184 and 186 which have beam center points 190, 192, 194 and 196, respectively at face 96 of prism 90. The beams 180, 182, 184 and 186 are deflected to the right such that the center of each beam 180, 182, 184 and 186 falls on the center of detectors 120, 122, 124 and 126, respectively.

Beams 180 and 182 are from the reflected read/write beam. Each has a different polarization which depends upon the magnetization of the recorded medium 66. A read/write data signal is obtained by subtracting the output of detector 122 from the detector 120 output. Beams 184 and 186 are the read/write ghost beams. A power signal which is proportional to the power of laser 4 is obtained by adding the outputs of detectors 124 and 126. Beams 160 and 162 are the reflected DRAW beams. Each has a different polarization which depends on the magnetization of the recorded medium 66. A DRAW data signal is obtained by subtracting the output of detector 130 from the output of detector 128. Beams 164 and 1266 are the DRAW ghost beams. A power signal which is proportional to the power of laser 15 is obtained by adding the outputs of detectors 132 and 143.

FIG. 4 shows a detailed close up of detector 120. Beam 180 is also used to provide focus and tracking signals. When lens 56 is properly focused on medium 66, beam 180 will appear on detector 120 as a circular pattern 200. If lens 56 is out of focus in one direction or the other, beam 180 will appear as an elliptical pattern 202 or 204. A focus signal is obtained by adding the outputs of detectors 120A and 120D and subtracting the sum of the outputs of detectors 120B and 120C.

If beam 60 is off track on disk 66, then beam 180 will be displaced towards detectors 120A and 120B or towards detectors 120C and 120D. A tracking signal is obtained by adding the outputs of detectors 120A and 120B and subtracting the sum of the outputs of detectors 120C and 120D.

Figure 5:
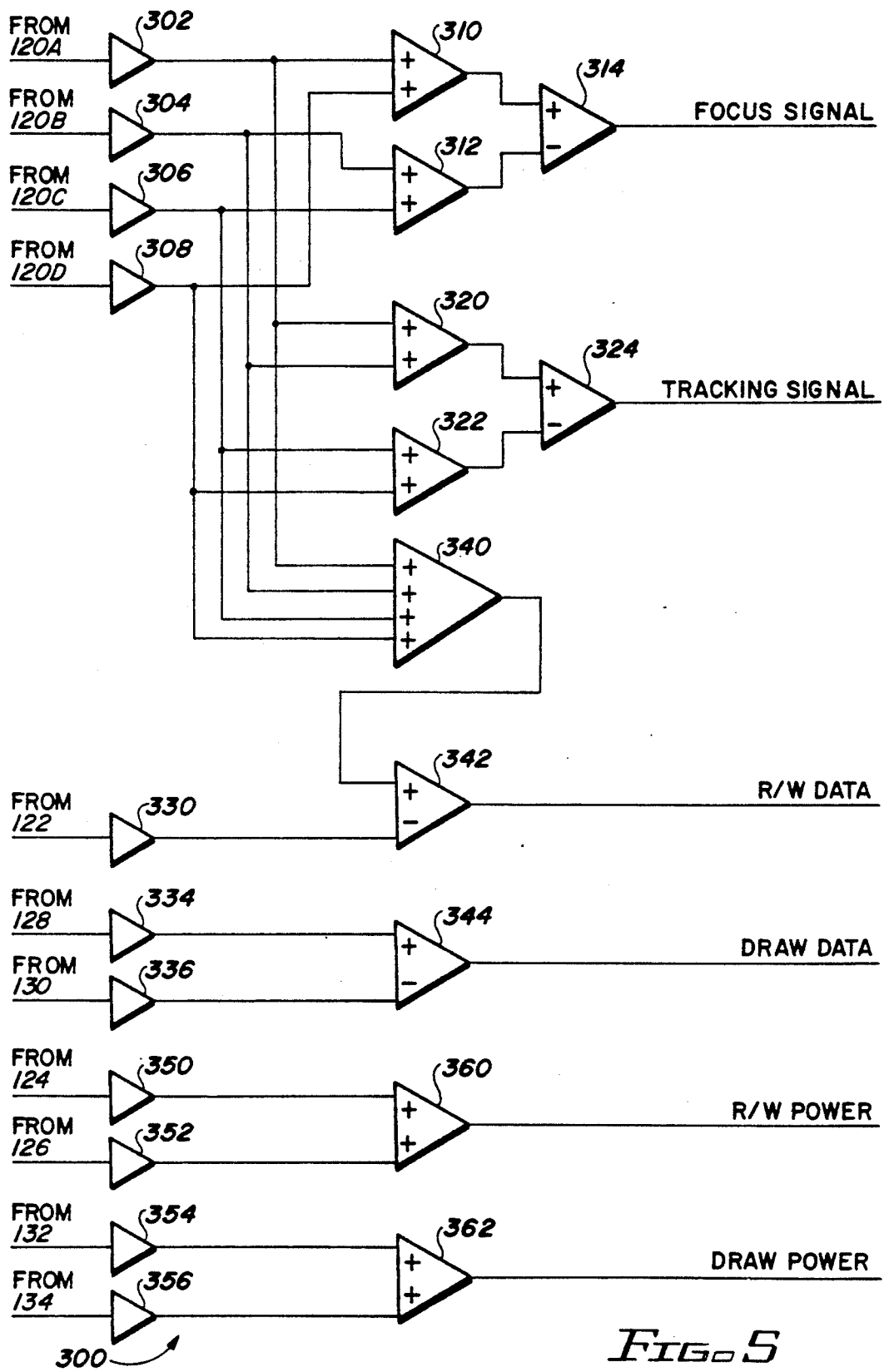
FIG. 5 is a circuit diagram of a detection circuit of the present invention.

FIG. 5 shows a circuit diagram of a detector circuit 300. A plurality of amplifiers 302, 304, 306 and 308 are connected to detectors 120A, 120B, 120C and 120D, respectively. Amplifiers 302 and 308 are connected to a summing amplifier 310. Amplifiers 304 and 306 are connected to a summing amplifier 312. Amplifiers 310 and 312 are connected to a differential amplifier 314. The output of differential amplifier 314 is the focus signal.

Amplifiers 302 and 304 are connected to a summing amplifier 320. Amplifiers 306 and 308 are connected to a summing amplifier 322. Amplifiers 320 and 322 are connected to a differential amplifier 324. A tracking signal is the output of differential amplifier 324.

A plurality of amplifiers 330, 334 and 336 are connected to detectors 122, 128 and 130, respectively. Amplifiers 302, 304, 306 and 308 are connected to a summing amplifier 340. Amplifiers 330 and 340 are connected to a differential amplifier 342. The output of amplifier 342 is the read/write data signal. Amplifiers 334 and 336 are connected to a differential amplifier 344. The output of amplifier 344 is the DRAW data signal.

A plurality of amplifiers 350, 352, 354 and 356 are connected to detectors 124, 126, 132 and 134, respectively. Amplifiers 350 and 352 are connected to a summing amplifier 360. The output of amplifier 360 is the power signal for the read/write laser 14. Amplifiers 354 and 356 are connected to a summing amplifier 362. The output of amplifier 362 is the power signal for the DRAW laser 15.

Figure 6:
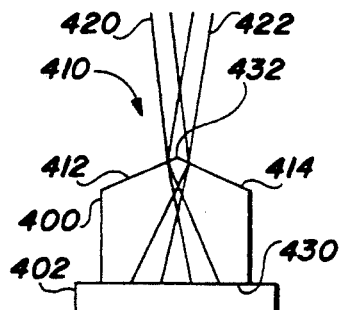
FIG. 6 is a schematic diagram of an alternative embodiment of a prism and optical detector combination.

FIG. 6 shows a faceted prism 400 and optical detector 402 which may be used in place of prism 90 and detector 110 of FIG. 1. Prism 400 has a faceted side 410 having a first face 412 and a second face 414, such that side 410 is convex in shape. The two sets of beams 420 and 422 are deflected through one another inside prism 400 to achieve the desired separation at detector 402 and by the difference between the focal planes of lens 72. The angle of faces 412 and 414 and the height of prism 400 are determined by the desired beam separation at photodetector 402. In a preferred embodiment, faces 412 and 414 are set at an angle of two hundred twenty degrees relative to one another and the distance between a surface 430 and a vertex 423 is 1.2 mm.

Figure 7:
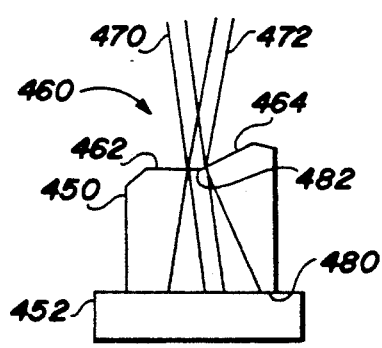
FIG. 7 is a schematic diagram of another embodiment having prism with asymmetrical faceted side.

FIG. 7 shows a faceted prism 450 and an optical detector 452 which may be used in place of prism 90 and detector 110 of FIG. 1. Prism 450 has a faceted side 460 having a first face 462 and a second face 464. The plane of face 462 is approximately perpendicular to the center line of the beam sets 470 and 472. Beam set 470 is not deflected by surface 462, but beam set 472 is deflected away from beam set 470 at face 464. The beam set 470 is preferably used for the read/write function. The angle of faces 462 and 464 and the height of prism 450 are determined by the desired beam separation at photodetector 452. In a preferred embodiment, faces 462 and 464 are set at an angle of one hundred forty degrees relative to one another and the distance between the surface 480 and a vertex 484 is 0.8 mm.

Figure 8:
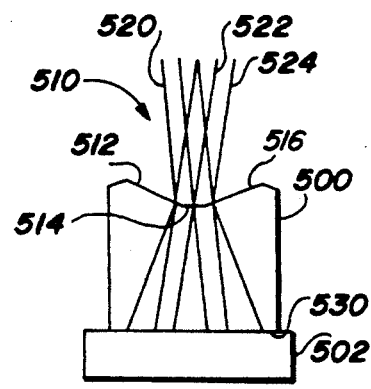
FIG. 8 is a schematic diagram of a further embodiment having a prism with a faceted side having three faces.

FIG. 8 shows a faceted prism 500 and an optical detector 502 for use in a three laser system. The prism 500 has a faceted side 510 having three faces 512, 514 and 516. Face 514 is approximately perpendicular to the center line of the three beam sets 520, 522 and 524. Beam sets 520, 522 and 524 hit faces 512, 514 and 516, respectively. Beam sets 520 and 524 are deflected in opposite directions from beam set 522. The angle of faces 512, 514 and 516 and the height of prism 500 are determined by the desired beam separation at photodetector 502. In a preferred embodiment, the distance between face 514 and surface 530 is 0.8 mm. In a preferred embodiment the planes of face 512 and 516 are set at an angle of forty degrees to face 514 and are sloped in opposite directions such that side 510 is concave in shape.

The advantages may now be understood. The faceted prism provides precise separation of closely spaced beam sets resulting from an optical system having more than one laser. The beams are separated for optical detection with a minimum of optical components and in a minimum amount of space. Additionally, the single integrated optical detector located below the prism provides, power, focus and tracking information in a compact amount of space.

The present invention may be used for other applications. For example, the invention may be used in DRAW heads of optical phase change systems and write once read many (WORM) optical systems as well as the magneto-optic system shown. In addition, the faceted prism of the present invention may be used to separate the beams of a multiple channel system. A multiple channel system is one which uses a laser array to simultaneously write and read parallel tracks of a disk. The present invention may also be used with alternative data, tracking error, focus error, and power detection schemes.

While the invention has been particularly shown and described with reference to a preferred embodiments thereof, it will be understood by those skilled in the art that various other changes in form and details may be made therein without departing from the spirit and scope of the invention.

What is claimed is:

1. An optical data storage system comprising:
   a light generation means for generating a first and a second discrete transmission light beams, the first and second light beams being spaced a distance apart and being nonparallel;
   an optical data storage medium;
   a means for focussing the first and second light beams to a first and a second locations, respectively, on the medium; and
   means for receiving a first reflected light beam and a second reflected light beam from the first and second locations, respectively, including a prism having a faceted side, the faceted side having a first and a second external faces set at an angle relative to one another, the first external face receiving the first reflected light beam and the second external face receiving the second reflected light beam such that the reflected first and the reflected second light beams are directed away from each other.

2. The system of claim 1, further including:
   a plurality of optical detectors located on a second side of the prism, opposite the faceted side, such that each of the detectors receives one of the reflected light beams.

3. The system of claim 2, further including:
   a detector circuit connected to the optical detectors for generating a data signal, a power monitor signal, a focus signal, and a tracking signal.

4. The system of claim 1, further including:
   a circularizing means located between the light generation means and the optical data storage medium for circularizing the first and second light beams.

5. The system of claim 1, wherein the faceted side of the prism is concave.

6. The system of claim 1, wherein the faceted side of the prism is convex.

7. The system of claim 1, wherein the faceted side of the prism has three external faces arranged in a concave shape.

8. A method for optical data storage comprising the steps of:
   generating a first and a second discrete transmission light beams, the first and second transmission light beams being spaced a distance apart and being nonparallel;

separately focussing the first and second transmission light beams to a first and a second location, respectively, on an optical data storage medium; and receiving at a prism a first reflected light beam and a second reflected light beam from the first and second locations, respectively, the prism having a faceted side, the faceted side having a first and a second external faces set at an angle relative to one another, the first external face receiving the first reflected light beam and the second external face receiving the second reflected light beam, such that the reflected first and the reflected second light beams are directed away from each other.

9. The method of claim 8, further including the step of:

circularizing the transmission light beams with a circularizing prism.

10. The method of claim 8, further including the steps of:

receiving the reflected light beams at a plurality of optical detectors; and generating a data signal, power monitor signal, focus signal and tracking signal responsive to the reflected light beams received at the optical detectors.

11. An optical data storage system comprising:

a laser array for providing a first and a second discrete polarized transmission light beams, the first and second transmission light beams being spaced a distance apart and being nonparallel;

an optical data storage medium;

optical transmission means for separately focussing said first and second transmission light beams to a first and a second locations, respectively, on the medium;

a polarization separation means for receiving a first reflected light beam and a second reflected light beam from the first and second locations, respectively, and transmitting a first and a second beam sets, said first beam set containing a first polarization component and a second polarization component of said first reflected light beam and said second beam set containing a first polarization component and a second polarization component of said second reflected light beam;

a faceted prism receiving the first and second beam sets, the faceted prism having a first side, the first side having a first and a second external faces set at an angle relative to one another, said first face for receiving said first beam set and deflecting it in a first direction and said second face for receiving said second beam set and deflecting it in a second direction; and a photodetector array for receiving said first and second beam sets.

12. The system of claim 11, wherein the photodetector is comprised of four sections, each section for receiving a single polarization component of said first and second beam sets.

13. The system of claim 11, wherein one of said photodetector sections has four subsections.

14. The system of claim 11, further including;

a detection circuit connected to the photodetector for generating a data signal, a power monitor signal, a focus signal, and a tracking signal.

15. An optical data storage system comprising:

a laser array for providing a first and a second discrete polarized transmission light beams, the first and second light beams being spaced a distance apart and being nonparallel;

a first collimating means for collimating the first and second transmission beams;

a circularizing means for circularizing the first and second transmission beams;

an optical data storage medium;

a first focussing means for separately focussing the first and second transmission beams to a first and a second location, respectively, on the medium;

a second collimating means for collimating a first and a second reflected light beams received from the first and second locations, respectively, of the medium;

a second focussing means for focussing the first and second reflected light beams;

a prism having a faceted side, then faceted side having a first and a second external faces set at an angle relative to one another, the first external face receiving the first reflected light beam and the second external face receiving the second reflected light beam such that the first and the second reflected light beams are directed away from each other; and an optical detector means for receiving the reflected light beams.

16. The system of claim 15, further including:

a polarization separation means located between the second focussing means and the prism, for dividing each reflected light beam into two orthogonal polarization component beams.

17. The system of claim 15, further including:

means for separating a portion of each of the first and second transmission beams and directing the portions to the optical detector means.

18. The system of claim 15, wherein the circularizing means is a beamsplitting prism.

* * * * *

UNITED STATES PATENT AND TRADEMARK OFFICE
CERTIFICATE OF CORRECTION

PATENT NO. : 5,216,562
DATED : June 1, 1993
INVENTOR(S) : Luecke et al.

It is certified that error appears in the above-identified patent and that said Letters Patent is hereby corrected as shown below:

Column 4, line 34, delete "1266" insert --166--.

Column 4, line 37, delete "143" insert --134--.

Signed and Sealed this

Eighth Day of March, 1994

Attest:

BRUCE LEHMAN

Attesting Officer

Commissioner of Patents and Trademarks